United States Patent [19]

Hunger

[11] Patent Number: 4,906,735
[45] Date of Patent: Mar. 6, 1990

[54] PROCESS FOR THE MANUFACTURE OF A MONOAZO ACETOACETYLAMINOBENZIMIDAZOLONE

[75] Inventor: Klaus Hunger, Kelkheim, Fed. Rep. of Germany

[73] Assignee: Hoechst Aktiengesellschaft, Frankfurt am Main, Fed. Rep. of Germany

[21] Appl. No.: 366,359

[22] Filed: Jun. 15, 1989

Related U.S. Application Data

[63] Continuation of Ser. No. 719,639, Apr. 4, 1985, abandoned, which is a continuation of Ser. No. 429,036, Sep. 30, 1982, abandoned.

[30] Foreign Application Priority Data

Oct. 9, 1981 [DE] Fed. Rep. of Germany ....... 3140141

[51] Int. Cl.$^4$ .................. C09B 26/36; C09B 67/48; C09B 67/54; C09B 67/10
[52] U.S. Cl. .................... 534/575; 534/742; 534/887; 106/496
[58] Field of Search ............. 534/575, 887, 742; 106/288 Q, 308, 309 Q

[56] References Cited

U.S. PATENT DOCUMENTS

| | | | |
|---|---|---|---|
| 3,109,842 | 11/1963 | Schilling et al. | 534/575 X |
| 3,124,565 | 3/1964 | Schilling et al. | 534/575 X |
| 3,137,686 | 6/1964 | Dietz et al. | 534/575 X |
| 3,328,384 | 6/1967 | Dietz et al. | 534/575 X |
| 4,024,124 | 5/1977 | Ribka | 534/575 X |

FOREIGN PATENT DOCUMENTS 1939466 2/1971 Fed. Rep. of Germany ...... 260/157

Primary Examiner—Floyd D. Higel
Attorney, Agent, or Firm—Curtis, Morris & Safford

[57] ABSTRACT

An improved process for the manufacture of a monoazo acetoacetylaminobenzimidazolone pigment of the formula.

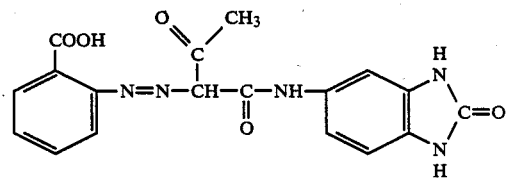

by coupling the components in an aqueous medium in the presence of an oxethylation product of an alcohol or alcohol mixture having from 8 to 14 carbon atoms and 3 to 10 mols of ethylene oxide, and heating the aqueous pigment suspension after complete coupling. The pigment thus obtained avoids an after-treatment in anhydrous organic solvents and has good tinctorial strength, high hiding power and good properties with respect to flow and dispersibility.

8 Claims, No Drawings

PROCESS FOR THE MANUFACTURE OF A MONOAZO ACETOACETYLAMINOBENZIMIDAZOLONE

This application is a continuation, of application Ser. No. 719,639, filed Apr. 4, 1985, now abandoned, which in turn is a continuation of application Ser. No. 429,036, filed Sept. 30, 1982, now abandoned.

The manufacture of a valuable pigment form of the azo compound of the formula I

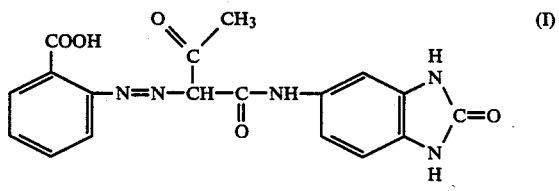

is described in Example 1 of U.S. Pat. No. 4,024,124. In this process, the crude pigment obtained by coupling in an aqueous medium is dried after isolation, powdered, refluxed for 2 hours in glacial acetic acid, suction-filtered, washed and dried. A pigment of soft grain, good tinctorial strength and clear shade is obtained in this manner.

Surprisingly, it has now been found that a valuable pigment form of this azo compound is obtained in an especially simple manner when coupling in an aqueous medium in the presence of an oxethylation product of a long-chain alcohol, and heating the aqueous pigment suspension after the coupling is complete.

The invention provides therefore a process for the manufacture of a pigment form of the azo compound of the above formula I by coupling of diazotized anthranilic acid onto 5-acetoacetylamino-benzimidazolone in an aqueous medium followed by a thermal after-treatment, which comprises coupling in the presence of an oxethylation product of an alcohol or alcohol mixture having from 8 to 14 carbon atoms and 3 to 10 mols of ethylene oxide, and heating the aqueous pigment suspension after the coupling is complete. Thus, the pigment is obtained in a valuable application form which can be compared with that of Example 1 of U.S. Pat. No. 4,024,124.

Preferred embodiments of the invention are described in detail as follows:

The oxethylation product is preferably added to an acid, solution based especially on acetic or mineral acid, which is used for precipitation of the coupling component. The amount of oxethylate added is advantageously from 2 to 15, especially 6 to 10, % relative to the pigment weight. Especially preferred are reaction products of aliphatic alcohols or alcohol mixtures having from 9 to 13 carbon atoms with from 5 to 8 mols of ethylene oxide. Suitable are alcohols from the oxo synthesis, for example sterically modified synthesis alcohols, such as isotridecanol reacted with 6 to 8 mols of ethylene oxide, or an alcohol mixture containing substantially 9 to 11 carbon atoms and reacted with 5 mols of ethylene oxide.

After termination of the coupling the pigment suspension is heated for 1 to 8, especially 2 to 4, hours at a temperature of from 92° to 100° C., especially 95° to 98° C. Subsequently, the pigment is isolated from the suspension, washed free from salt, and dried.

The pigment obtained in accordance with the invention is suitable for the manufacture of printing inks, for the pigmentation of plastic materials, natural and synthetic resins and rubbers, and especially for the manufacture of varnishes and dispersion paints. The pigment is furthermore appropriate for pigment print on textile fiber materials and other web-like structures, moreover for the spin dyeing of viscose, cellulose esters or ethers, polyamides, polyurethanes, polyglycol terephtalates or polyacrylonitrile.

In the case where operations are in accordance with the process of the invention with the exception, however, of adding the oxethylation product of the long-chain alcohol, the pigment is obtained in a turbid quality of poor tinctorial strength, insufficient flow and dispersibility; that is, a form which is unsuitable for application in the practice.

The following Examples illustrate the invention; percentages being by weight unless otherwise stated.

EXAMPLE 1

13.7 g of anthranilic acid were stirred with 250 ml of water and 50 ml of 5N hydrochloric acid, and diazotizid with 20 ml of 5N sodium nitrite solution. This diazo solution was poured at 25° C. with stirring into an acetic suspension of the coupling component, which was prepared as follows:

24 g of 5-acetoacetylamino-benzimidazolone were stirred at room temperature with 200 ml of water, and dissolved by adding 60 ml of 5N sodium hydroxide solution. The solution was clarified by means of active charcoal, and the filtrate was added dropwise within 30 minutes while stirring to a solution of 30 ml of water, 41 ml of glacial acetic acid, 80 ml of 5N sodium hydroxide solution and 3 g of a reaction product of 1 mol of an industrial-grade alkanol fraction containing substantially 9 to 11 carbon atoms with 5 mols of ethylene oxide.

The coupling being complete, the suspension was heated to 95°–97° C. by introducing steam, and maintained for 3 hours at this temperature. At 60°–70° C., the suspension was filtered, the press cake was washed free from salt, dried and ground.

The pigment obtained had the same good application properties as a product manufactured according to Example 1 of U.S. Pat. No. 4,024,124.

COMPARATIVE EXAMPLE

Operations were as described in Example 1, except that no oxethylation product was added. A turbid, more reddish yellow pigment having a reduced tinctorial strength, poor hiding power, poor dispersibility and a too high viscosity in the varnish was obtained.

EXAMPLE 2

137 g of anthranilic acid were introduced into a mixture of 260 ml of 31% hydrochloric acid and 2,750 ml of water. The stirred solution was cooled to 3° C. and diazotized within 10–15 minutes with 131 ml of 40% aqueous sodium nitrite solution. Stirring was continued for 30 minutes at 10° C. with excess nitrite, 15 g of kieselguhr were added as clarifying auxiliary, the excess of nitrite was destroyed with about 1 g of amidosulfonic acid, and the diazonium salt solution was clarified.

A solution of 2,000 ml of water, 180 ml of 33% sodium hydroxide solution and 240 g of 5-acetoacetylamino-benzimidazolone was poured within 30 minutes into a solution of 800 ml of water, 200 g of ice, 116 ml of glacial acetic acid and 30 g of an oxethylation product of a $C_{13}$-alcohol mixture and 6 mols of ethylene oxide. 150 g of calcium carbonate were added to the suspension of the coupling component, and warmed to 35° C. At this temperature, the diazonium salt solution was added dropwise within 2 hours below the surface of the 5-acetoacetylamino-benzimidazolone suspension.

The coupling being complete, the pH was adjusted to 2 by slowly adding 368 ml of 33% hydrochloric acid within 45 minutes. Subsequently, the batch was heated to 95° C. by introduction of steam, and maintained at this temperature for 2 hours. After cooling to 70° C., the batch was filtered, the product was washed free from salt and dried at 70° C. in a drying cabinet with air circulation.

A brilliant, greenish yellow pigment having good tinctorial strength, excellent hiding power, good dispersibility and flow, and high gloss in the varnish was obtained.

EXAMPLE 3

Operations were as in Example 2; however, as oxalkylation product a product containing 8 mols of ethylene oxide was used. A pigment was obtained which had the application properties as described in Examples 1 and 2.

What is claimed is:

1. A process for the manufacture of a pigment form of the azo compound of the formula I

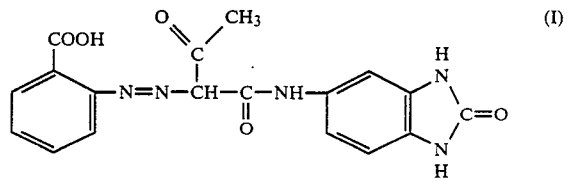

by coupling of diazotized anthranilic acid onto 5-acetoacetylamino-benzimidazolone in an aqueous medium followed by a thermal after-treatment, which consists of coupling in the presence of an oxethylation product of an alcohol or alcohol mixture having from 8 to 14 carbon atoms and 3 to 10 mols of ethylene oxide to form an aqueous pigment suspension, and heating the aqueous pigment suspension to 92° to 100° C. after the coupling is complete.

2. The process as claimed in claim 1, wherein the oxethylation product is a reaction product of an aliphatic alcohol or alcohol mixture having from 9 to 13 carbon atoms with 5 to 8 mols of ethylene oxide.

3. The process as claimed in claim 1, wherein the oxethylation product is present from 2 to 15% relative to the pigment weight.

4. The process as claimed in claim 3, wherein the oxethylation product is present from 6 to 10% relative to the pigment weight.

5. The process as claimed in claim 1, wherein the aqueous pigment suspension is heated to 95° to 98° C.

6. The process as claimed in claim 1, wherein the aqueous pigment suspension is heated for 1 to 8 hours.

7. The process as claimed in claim 6, wherein the aqueous pigment suspension is heated for 2 to 4 hours.

8. The process as claimed in claim 1, wherein the oxethylation product is combined with an acid solution of acetic or mineral acid so that the 5-acetoacetylamino-benzimidazolone precipitates before coupling.

* * * * *